United States Patent [19]
Mesnel

[11] Patent Number: 4,982,529
[45] Date of Patent: Jan. 8, 1991

[54] SEAL STRUCTURES, PARTICULARLY FOR AUTOMOBILE BODYWORK

[75] Inventor: Francois Mesnel, Neuilly S/Seine, France

[73] Assignee: Mesnel S.A., Carrieres S/Seine, France

[21] Appl. No.: 382,123

[22] Filed: Jul. 19, 1989

[51] Int. Cl.⁵ ............................................. E06B 7/16
[52] U.S. Cl. ...................................... 49/491; 49/497; 277/226; 277/235 R; 277/237 R; 428/122
[58] Field of Search .................. 277/140, 237 R, 226, 277/227, 228, 235 R; 49/490, 491, 479, 497; 428/122

[56] References Cited

U.S. PATENT DOCUMENTS

| | | | |
|---|---|---|---|
| 3,165,793 | 1/1965 | Lynch | 24/293 |
| 3,638,359 | 2/1972 | Kruschwitz | 49/490 |
| 4,123,100 | 10/1978 | Ellis | 49/490 |
| 4,188,765 | 2/1980 | Jackson | 49/490 |
| 4,271,634 | 6/1981 | Andrzejewski | 49/491 |
| 4,304,816 | 12/1981 | Bright et al. | 49/490 |
| 4,830,898 | 5/1989 | Smith | 49/490 |

FOREIGN PATENT DOCUMENTS

2024296 1/1980 United Kingdom ................ 49/491

Primary Examiner—Allan N. Shoap
Assistant Examiner—Daniel G. DePumpo
Attorney, Agent, or Firm—Foley & Lardner, Schwartz, Jeffery, Schwaab, Mack, Blumenthal & Evans

[57] ABSTRACT

The invention relates to a profile for a seal comprising a metal reinforcement having a U-shaped cross-section. The reinforcement is sheathed with plastic. At least one virtually inextensible filament is embedded in the plastic in an intermediate zone between the profile and an associated sealing element in the region of the median fiber of the profile. According to the invention, the metal reinforcement is formed by bending a planar reinforcement into the shape of a U. The planar reinforcement comprises a succession of exposed rectangular elements having long sides perpendicular to the plane of symmetry of the U and short sides parallel to this plane of symmetry. The rectangular elements are joined to the contiguous elements by two spacers parallel to the plane of symmetry of the U.

9 Claims, 1 Drawing Sheet

SEAL STRUCTURES, PARTICULARLY FOR AUTOMOBILE BODYWORK

BACKGROUND OF THE INVENTION

1. Field of the Invention

The present invention relates generally to sealing structures and more particularly to sealing structures of the type known as complex.

2. Discussion of Related Art

Complex seals comprise a profile in the shape of a U-section having a metal reinforcement sheathed in a flexible material such as rubber or plastic. This type of profile is intended to be fixed by crimping on a projecting edge or a projecting part of an automobile body. This profile is associated with a sealing element, which is, for example, hollow and is intended to be compressed between two parts of the bodywork, for example, a door and its frame.

In order to avoid deformations and, in particular, sagging of the profile in areas of pronounced curvature, which would result in lack of leaktightness between the surfaces separated by the seal, commonly assigned U.S. Pat. No. 4,310,164 suggests a profile defined by the combination of two features:

- a U-shaped metal reinforcement which is broken down into alternating exposed sections, resulting from the presence, alternately, of discontinuous spacers aligned axially in the plane of the spread-out profile and of discontinuous spacers oriented laterally relative to the axis; and
- plastic which coats this reinforcement and incorporates, in a manner known per se, at least one virtually inextensible filament made, for example, of glass fiber, in an intermediate zone between the profile and the contiguous sealing element and, more specifically, in the median fiber zone of the profile.

In respect of the first feature, the aforementioned U.S. Patent explains that the intention is to remedy the disadvantages of reinforcements used in the previously known art which were of a shape known as "fish-bone." That is to say, comprising a longitudinal element possessing, on either side, perpendicular lateral appendices, or appendices which were evenly formed of separate and distinct elements.

SUMMARY OF THE INVENTION

In pursuing studies of this type of seal, the applicant has established that, in order to ensure that the reinforcement retains the flexibility required by the bodywork profiles to which it has to be adapted, while imparting to the profile a monolithic appearance comparable to that which would be imparted to it by a continuous U-shaped metal reinforcement, it is desirable to move even further away from the fish-bone shape of the traditional reinforcements.

Consequently, an object of the present invention is to eliminate from the reinforcements of the profiles according to the aforementioned patent the surviving portions of the central spine, that is to say, the spacers oriented in the plane of symmetry of the reinforcement.

To this end, the present invention therefore relates to a profile for a seal, comprising a metal reinforcement of U-shaped cross-section, sheathed with plastic, and a sealing element attached to the plastic. The metal reinforcement is formed by shaping into a U a planar reinforcement comprising a succession of exposed rectangular elements possessing long sides perpendicular to the plane of symmetry of the U and short sides parallel to this plane of symmetry. The rectangular elements are joined to the contiguous elements by two spacers parallel to the plane of symmetry of the U and to the short sides. These spacers are arranged symmetrically relative to the plane of symmetry of the U. The spacers will preferably have a width substantially equal to that of the short sides of the rectangular elements and they will advantageously be arranged one in the extension of the other.

At least one virtually inextensible filament is disposed in an intermediate zone between the profile and the sealing element, in the region of the median fiber of the profile.

In this case, the inextensible filament embedded in the plastic will preferably be contiguous to the spacers and parallel thereto.

The reinforcement of the profile according to the invention can be produced in a conventional manner by cutting a metal strip, for example, a cold-laminated steel hoop or an aluminum strip.

The distance separating the contiguous rectangular elements will preferably be substantially equal to the spacing between the long sides of these elements. It will of course depend on the nature of the material used and on its thickness, with a view to imparting, to the profile obtained by extruding the sheath of plastic onto the metal reinforcement, a perfect straightness giving the impression of a profile possessing a continuous reinforcement. In practice, a distance of about 1.2 mm between contiguous rectangular elements and between long sides of the rectangular elements proves to give an ideal effect for the usual thicknesses of the metal reinforcements for such profiles, which are of the order of 0.5 to 0.6 mm.

BRIEF DESCRIPTION OF THE DRAWINGS

The attached drawings, which have no limiting character, illustrate a preferred embodiment of the profile according to the present addition. In these drawings.

DETAILED DESCRIPTION OF THE PREFERRED EMBODIMENTS

Figure 1:
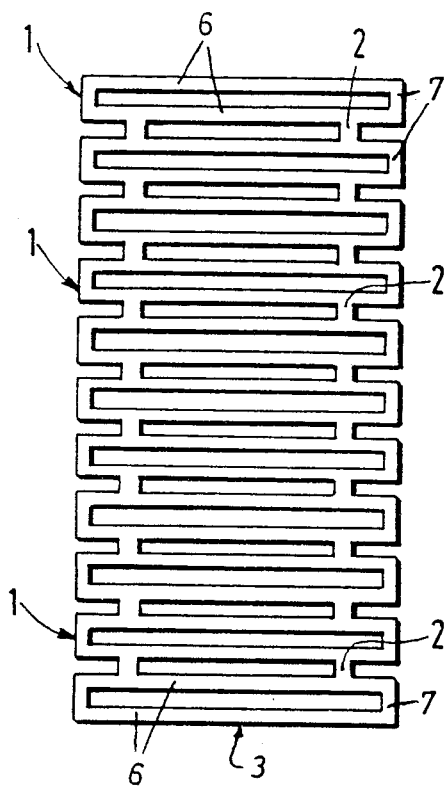
FIG. 1 is a plan view of a section of metal strip appropriately cut to form, after being folded into a U, the reinforcement of a profile according to the present invention.

As can be seen in FIG. 1, the reinforcement 3 of the profile according to the invention comprises a succession of rectangular elements 1. The elements 1 have long sides 6 and short sides 7 perpendicular to the former. The long sides 6 are connected to the long sides of adjacent rectangular elements by lateral spacers 2. The spacers 2 are arranged symmetrically, after being shaped into a U (see FIG. 2), relative to the plane of symmetry of the reinforcement. The spacers 2 are arranged one in the extension of the other, parallel to the short sides 7. These spacers 2 have the same length as the short sides 7 of the rectangular elements 1, and this length can advantageously be of the order of about 1.2 mm but could be in the range of about 1 mm to 1.5 mm. This is sufficient spacing to provide the profile with ample flexibility but is small enough to be filled with plastic during the extrusion process to provide the appearance of a continuous core, as will be discuss further below.

Figure 2:
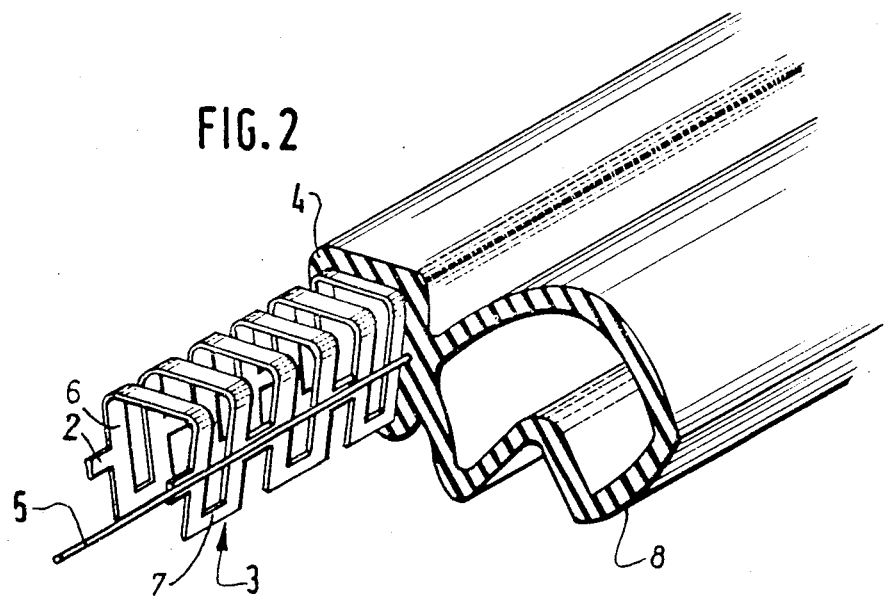
FIG. 2 is a view of a seal for an automobile body possessing a profile according to the invention.

The profile as such, which is seen in FIG. 2, possesses a plane of symmetry. The profile comprises the reinforcement 3 of FIG. 1, bent into a U-shape and sheathed with a plastic 4 such as polyvinyl chloride which is extruded onto the profile 3. A tubular sealing element 8 is bonded onto the profile or coextruded therewith. This sealing element can of course be of absolutely any type whatever. Because of the short distance between the contiguous rectangular elements and between the sides of the rectangular elements, the extruded plastic completely fills these spaces, preventing the formation of ripples in the plastic. This gives an ideal aspect effect of smoothness without ripples, as if the core was solid and continuous. However, the final product still has excellent flexibility characteristics.

At least one virtually inextensible filament 5 is imbedded in the plastic. The filament 5 may be made, for example, of glass fiber or viscose, and is arranged in the zone called the zone of median fibers, parallel to the spacers 2 and in the vicinity of the latter end of the sealing element 8.

As indicated above, with the metal reinforcement according to the present invention, a profile is obtained which combines both the flexibility desired for this type of profile and a monolithic appearance giving the impression of a continuous reinforcement.

The foregoing description is set forth for the purpose of illustrating the invention but is not deemed to be limitative thereof. Clearly, numerous additions, substitutions and other modifications can be made without departing from the scope of the invention as set forth in the appended claims.

What is claimed is:

1. An apparatus, comprising:
    a profile for a seal, comprising:
    a metal reinforcement having a U-shaped cross-section with two substantially straight branches terminating in free ends and a bight connecting said two branches, said metal reinforcement including a succession of U-shaped rectangular elements having long sides perpendicular to the plane of symmetry of the U and short sides parallel to this plane of symmetry, said rectangular elements being joined to adjacent rectangular elements by two spacers parallel to the plane of symmetry of the U and the short sides and positioned, respectively, in said branches spaced from said free ends, these spacers being arranged symmetrically relative to the plane of symmetry of the U and being offset from the short sides so that a continuous space results between each pair of long sides through the bight of the metal reinforcement and alternate spaces result between the long sides at said free ends of the branches of the U, where the rectangular elements and the long sides of the rectangular elements are separated by a distance of less than about 1.5 mm; and
    a covering on said metal reinforcement, said covering filling the spaces between said rectangular elements and the long sides of the rectangular elements to provide a smooth outer appearance without ripples;
    a sealing element attached to said covering; and
    at least one virtually inextensible filament in an intermediate zone proximate said spacers.

2. The apparatus as claimed in claim 1, wherein said spacers are arranged one in the extension of the other.

3. The apparatus as claimed in claim 2, wherein said inextensible filament is arranged parallel to the spacers in the immediate vicinity thereof.

4. The apparatus as claimed in claim 3 wherein said sealing element is directly attached to the covering of one of the branches of the U, wherein the filament of inextensible material is embedded in the covering between said spacers and the sealing element.

5. The apparatus as claimed in claim 1, wherein said spacers and the short sides of the rectangular elements have a substantially identical length.

6. The apparatus as claimed in claim 1, wherein the distance separating adjacent rectangular elements is substantially equal to the spacing between the long sides of these elements.

7. The apparatus as claimed in claim 1 wherein said covering is plastic and said filament is imbedded in said plastic.

8. The apparatus as claimed in claim 1 wherein the distance between rectangular elements and the long sides of the rectangular elements is less than about 1.2 mm.

9. The apparatus as claimed in claim 1 wherein the distance between rectangular elements and the long side of the rectangular elements is greater than about 1 mm.

* * * * *